Figure 1:
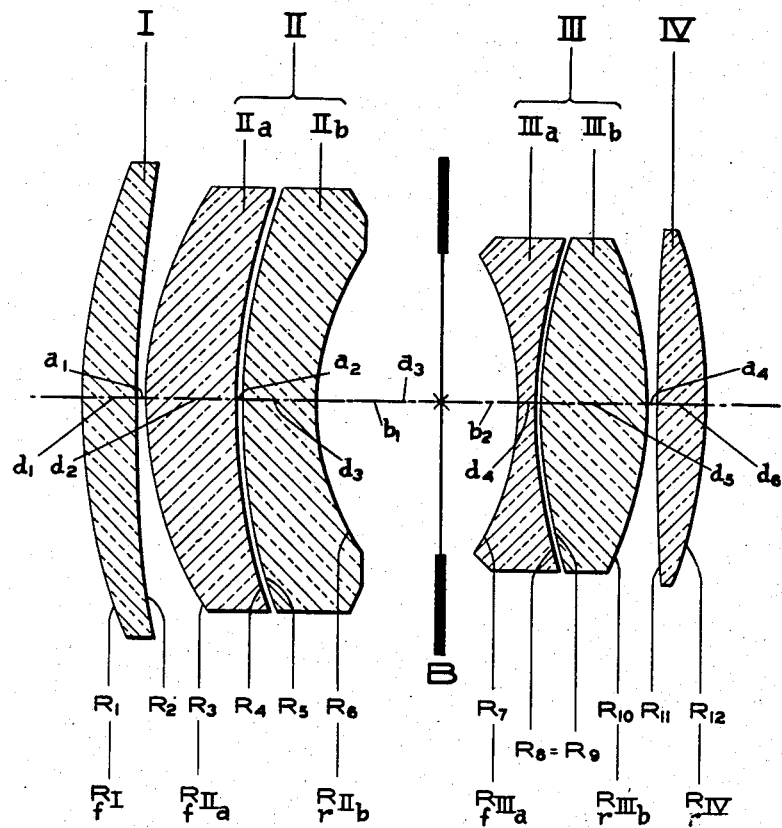

Feb. 3, 1953

A. W. TRONNIER  2,627,204
FOUR-COMPONENT GAUSS-TYPE PHOTOGRAPHIC OBJECTIVE
OF HIGH LIGHT-TRANSMITTING CAPACITY

Filed Dec. 28, 1950  3 Sheets-Sheet 1

INVENTOR
ALBRECHT WILHELM TRONNIER

BY *Mock & Blum*

ATTORNEYS

Patented Feb. 3, 1953

2,627,204

UNITED STATES PATENT OFFICE 2,627,204

FOUR-COMPONENT GAUSS-TYPE PHOTOGRAPHIC OBJECTIVE OF HIGH LIGHT-TRANSMITTING CAPACITY

Albrecht Wilhelm Tronnier, Gottingen, Germany, assignor to Voigtlander & Sohn Aktiengesellschaft, Braunschweig, Germany, a corporation of Germany Application December 28, 1950, Serial No. 203,179
In Switzerland April 29, 1950

4 Claims. (Cl. 88—57)

This invention relates to a photographic objective of the modified Gauss-type, which has high light-transmitting capacity, is corrected spherically, chromatically, astigmatically and for coma and is distinguished by a substantial improvement of the lateral correction in comparison with known objectives of the beforementioned type.

The main object of the present invention is to provide a photographic objective of the above mentioned type in which an improved simultaneous combined effect of correction for coma and zoneless anastigmatic image field flatness is attained by a specific distribution of the refractive indices of the lens elements in combination with a specific distribution of the lens curvatures.

Numerous other objects, advantages and features of this invention are set forth in the following description and the annexed drawings, which include some examples of the invention, to which the invention is not limited.

The photographic objective of high light-transmitting capacity according to the present invention is contemplated for taking photographic pictures and for projection, and is corrected spherically, chromatically, astigmatically and for coma. The objective according to this invention belongs to a modified Gauss-type. It consists of a system of four individual structural lens units, in which the central air-space serves as the diaphragm space. In this system, the two outer lens units have a distinct converging effect and consist preferably of individual, and in this case uncemented, positive lenses. The two inner lens units of the system are composed of two members and have altogether a distinct diverging effect. These two inner units are enclosed by the two outer units in the following manner: the radii of curvature of the outer lens surfaces of the two inner units, i. e. of the units adjacent the diaphragm, have such values and are convex toward the respective outer units in such a manner that, on the one hand, the diverging surfaces of highest dioptric effect are turned toward the diaphragm in both halves of the system and, on the other hand, the converging surfaces of highest dioptric effect, of the positive lens elements in the two halves of the system, are each turned away from the diaphragm.

In the new objectives according to the present invention, a substantial improvement of the lateral correction is attained in comparison with the objectives of high light-transmitting capacity of the conventional Gauss-type. In the latter either anastigmatic image flatness with relatively small zonal aberrations, is attained, together with a simultaneous, considerable overcorrection for coma of widely open pencils, or a moderate correction of zonal aberrations in combination with a strong curvature of the astigmatic image shells.

It has now been found that a considerable improvement with regard to the simultaneous correction with relatively small zonal aberrations, of both kinds of aberrations and a combination of both types of correction can be attained according to the present invention by combining the distribution of refraction indices within the dioptrically highly effective lenses of the two lens units which follow the diaphragm and are located on the side of the shorter conjugate, with the simultaneous application of the curvatures according to the invention, of the two inner lens units of the objective system, enclosing the diaphragm.

In order to clearly explain the invention, the four units of the present modification of the Gauss-type objective are denoted in the enclosed drawings in the order of their position I, II, III, IV and the individual elements of the units consisting of more than one element are denoted by an index consisting of a small letter of the alphabet (for example $II_a$, $II_b$, or $III_a$, etc.). Furthermore, the glasses used are characterized by their mean refractive indices consecutively numbered starting at the side of the longer conjugate and proceeding toward the side of the shorter conjugate (for example $n_1$, $n_2$, $n_3$ . . . etc.).

In order to identify the radii of curvature, they are denoted by an index $f$ if in their unit they are on the side of the longer conjugate, i. e. on the front side in the meaning of the photographic picture, while the radii of curvature which are in their unit on the rear side in the meaning of the photographic picture, i. e. on the side of the shorter conjugate, are denoted by an index $r$.

In my co-pending patent application entitled "Corrected Photographic Objective of High Light-Transmitting Capacity," filed under Ser. No. 203,180 on December 28, 1950, I have described a photographic objective of the modified Gauss-type distinguished by the following specific characteristics: The curvatures of the two altogether diverging inner lens units (II and III) enclosing the diaphragm, are selected in such a manner that their outer radii turned toward the adjacent outer units (I and IV) i. e. the radii $R_{f II_a}$ and $R_{r III_b}$ are selected in such a manner that their sum is positive and distinctly larger than zero; furthermore, the refractive indices of the lens glasses continuously increase from the center of the system toward the side of the shorter conjugate for the lenses adjacent the image side, i. e. in the meaning of the photographic picture, each individual step of this specific increase of the refractive index being distinctly greater than 0.0185.

I have now found that photographic objectives of the type described in the preceding paragraph can be further improved, and particularly the aberrations of widely open lateral pencils, for example in meridional section, i. e. the meridional coma, and related aberrations, can be further substantially reduced, if, in addition to the characteristics of the invention outlined in the preceding paragraph, the following characteristics are also embodied in the lens system according to my present invention: the refractive index of the glass of the diverging lens (III$_a$) following the diaphragm in the direction of the photographic picture, is distinctly smaller than the refractive index for the same color of the glass of the diverging lens (II$_b$), which precedes said diverging lens (III$_a$), is located on the side of the longer conjugate and limits the diaphragm space by a concave surface; moreover, and simultaneously, said diverging lens III$_a$ has a smaller refractive index for the same color, than the converging lens III$_b$, which follows lens III$_a$ in the direction of the light. This means that these two lenses II$_b$ and III$_b$, adjacent and surrounding on both sides diverging lens III$_a$, consist of glasses, the refractive indices $n_3$ and $n_5$ of which are higher than refractive index $n_4$ of diverging lens III$_a$, which follows the diaphragm; at the same time and in addition to this, the difference of refractive indices (for the same spectral colors) of the glasses at the dioptrically most effective diverging surface $R_{t III_a}$ which is adjacent the diaphragm on the side of the shorter conjugate, and at the positive converging surface $R_{r IV}$ which is the most remote from the diaphragm, on the side of the shorter conjugate, is distinctly greater than 0.0370, so that, for example, $n_6 - n_4 > 0.0370$.

For one half of a Gauss-type objective, and also for a lens position following the diaphragm, a sequence of refractive indices increasing from the diaphragm in the direction of the light, has been suggested in the German Patent No. 439,556. However, it was not recognized then that the combination of (a) a particularly strong and progressive increase of the refractive indices with (b) the above outlined distribution of the outer curvatures of the inner units of the total objective, enclosing the diaphragm, is necessary in order to obtain the simultaneous, combined effect of correction for coma and anastigmatic image field flatness with small zonal aberrations. This new combination according to my invention results in the elimination of disadvantages of known photographic objectives of the type here in question and in an objective of new and improved structure.

Figure 2:
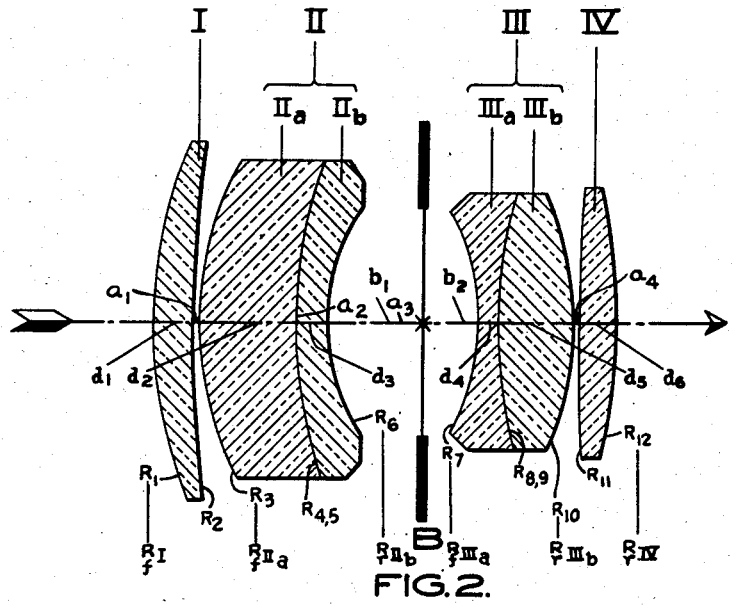
Figure 4:
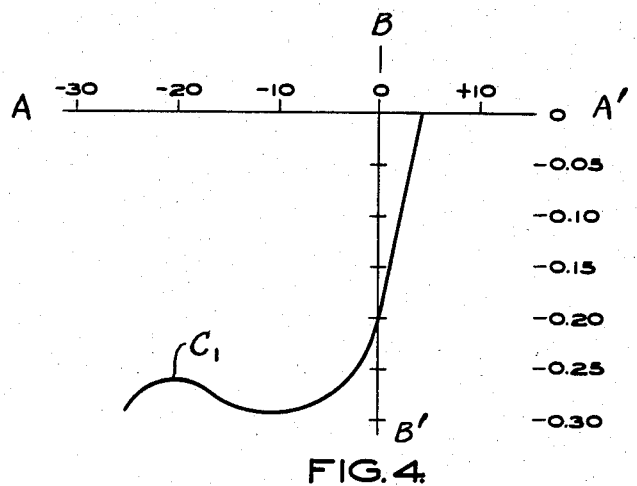
Figure 5:
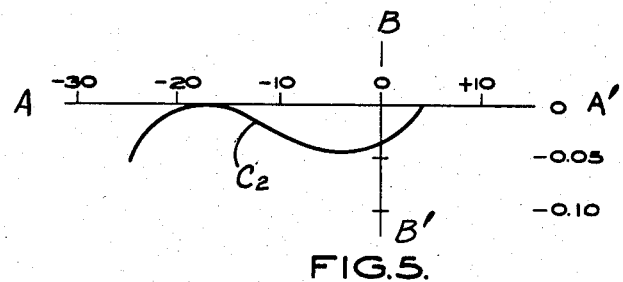
Figure 6:
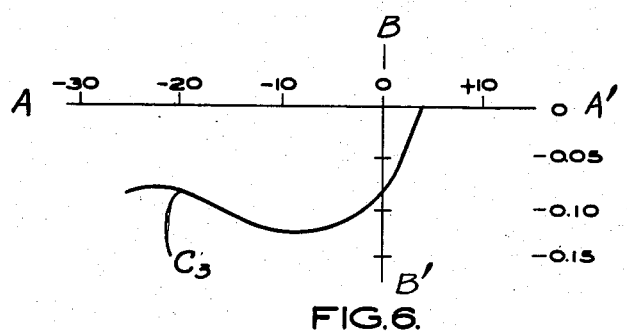

In the appended drawings, Figure 1 is a general structural illustration of the invention. Figure 2 illustrates an objective of lower light-transmitting capacity, in which the two inner units II and III consist of cemented lenses, while Figure 3 shows an embodiment of higher light-transmitting capacity, and Figures 4, 5, 6 show the curve of meridional coma of a conventional objective and in the examples of the present application, respectively.

Figure 1 is a general structural illustration of the invention and shows the reference numerals used in the present application.

Figure 2 illustrates an embodiment of low light-transmitting capacity according to the present invention, in which the two inner units II and III consist of cemented lenses, in a manner known per se. This objective shown in the conventional manner in axial section, is contemplated for reproduction purposes and represents a projector objective of a medium-sized image angle, having a relative aperture of 1:2.3 at a useful image field extension of about 50°.

Figure 3:
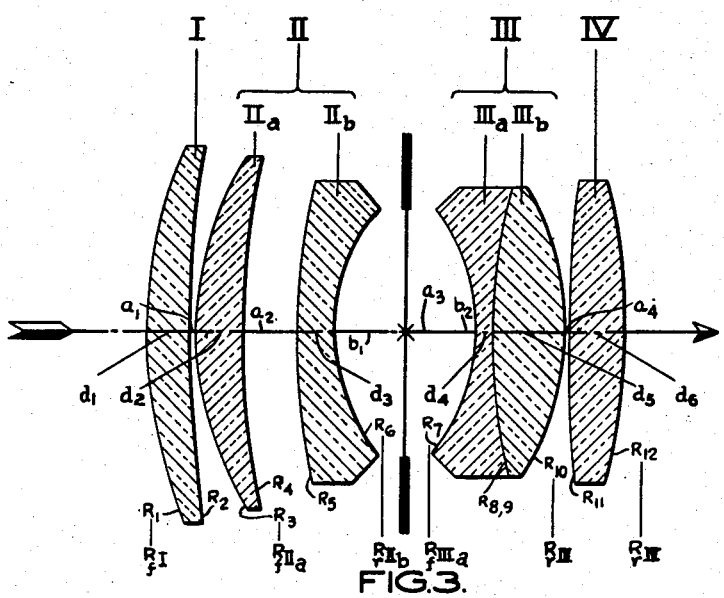

Figure 3 illustrates an embodiment of higher light-transmitting capacity. All constructive details of this embodiment are shown in the following table. In this example, the inner unit (II) which is composed of several elements, arranged on the side of the longer conjugate and precedes the diaphragm in the meaning of the photographic picture, consists of two uncemented individual lenses of opposite power, which are separated by a meniscus-shaped air layer. The relative aperture of this embodiment illustrated by way of example amounts to 1:2.0. The useful image field of this objective amounts to 55°.

Figure 4 shows the curve of meridional coma in the form of zonal image height aberrations of a Gauss-type objective corresponding to the state of the prior art.

Figures 5 and 6 show the corresponding aberrations in the examples of the present application for the same inclination of the principal rays on the side of the object and for the same cross-section of rays. Therefore, the division of the axis of abscissas is equal to that in Figure 4. The division of the axis of ordinates has the same magnitude of intervals as in Figure 4.

In conformity with the following tables, in the drawings R denotes the radii of curvature and $d$ the thickness of the lenses, the distances of which in the air are denoted $a$. The refractive indices of the glasses used are stated for the yellow light of the Fraunhofer line $d$ with a wave length of 5876 AE, while the color dispersion of these glasses is characterized by the Abbé number $\mu$. The diaphragm located between the inner units II and III is denoted B. The paraxial intersectional width of the objective, determining the length of the shorter conjugate, for objects at infinite distance, referred to rays near the axis, is denoted $p_0'$. The data of these examples refer to a focal length of 1, while the respective axial sections of the lenses of the present invention, reproduced in Figures 2 and 3, are illustrated for a focal length of f=150 mm. in natural size.

Example I $[f=1.0 \quad 1:2.3 \quad p_0'=0.7177]$

| | | | |
|---|---|---|---|
| $R_1 =+0.60708$ | $d_1=0.05695$ | $n_1=1.63909$ | $\nu_1=55.7$ |
| $R_2 =+1.64332$ | $a_1=0.00205$ | air | |
| $R_3 =+0.40395$ | $d_2=0.13076$ | $n_2=1.61136$ | $\nu_2=59.0$ |
| $R_4 =+0.66243$ | $a_2=0$ | | |
| $R_5 =R_4$ | $d_3=0.04009$ | $n_3=1.64819$ | $\nu_3=33.7$ |
| $R_6 =+0.26875$ | $a_3=0.19881$ $\quad b_1=0.12480$ $\quad b_2=0.07401$ | diaphragm space | |
| $R_7 =-0.28160$ | $d_4=0.02508$ | $n_4=1.58241$ | $\nu_4=40.6$ |
| $R_8 =R_9 =+0.60708$ | $d_5=0.10485$ | $n_5=1.61136$ | $\nu_5=59.0$ |
| $R_{10}=-0.38692$ | $a_4=0.00308$ | air | |
| $R_{11}=+2.68465$ | $d_6=0.04996$ | $n_6=1.63909$ | $\nu_6=55.7$ |
| $R_{12}=-0.77385$ | | | |

According to the above table $$R_3 =+0.40395$$
$$R_{10}=-0.38692$$
$$R_3+R_{10}=+0.01703$$

The value of $+0.01703$ is distinctly greater than zero and clearly positive.

$n_3$ is 1.64819 and $n_5$ is 1.61136. Thus, both values are greater than $n_4=1.58241$. Preferably $$\frac{n_3+n_4}{2}$$

has a value higher than 1.59.

Furthermore, $n_6-n_4=1.639 09-1.58241=0.05668$, i. e. distinctly greater than 0.0370. The individual steps of the increase of the refractive indices are as follows:

$n_5-n_4=1.61136-1.58241=0.02895$, i. e. distinctly greater than 0.0185, and simultaneously $n_6-n_5=1.63909-1.61136=0.02773$, i. e. distinctly greater than 0.0185.

the increase of the refractive indices are as follows:

$n_5-n_4=1.69347-1.63652=0.05695$, i. e. clearly greater than 0.0185, and, simultaneously, $n_6-n_5=1.72381-1.69347=0.03034$, i. e. distinctly greater than 0.0185.

The radii of curvature of the individual refractive surfaces are in the following ranges:

$0.4\,F<R_1<0.8\,F$
$1.0\,F<R_2<3.0\,F$
$0.3\,F<R_3=R_{,II_a}<0.6\,F$
$0.4\,F<R_4<4.0\,F$
$0.4\,F<R_5<4.0\,F$
$0.18\,F<R_6=R_{,II_b}<0.36\,F$
$0.18\,F<R_7=R_{,III_a}<0.36\,F$
$0.5\,F<R_8<2.0\,F$
$0.5\,F<R_9<2.0\,F$
$0.3\,F<R_{10}<0.6\,F$
$1.0\,F<R_{11}<\infty$
$0.6\,F<R_{12}<1.0\,F$ The focal lengths of the four individual struc-

Example II $[f=1.0 \quad 1:2.0 \quad p_0'=0.6972]$

| | | | |
|---|---|---|---|
| $R_1 =+0.63214$ | $d_1=0.05996$ | $n_1=1.62139$ | $\nu_1=60.3$ |
| $R_2 =+1.76011$ | $a_1=0.00400$ | air | |
| $R_3 =+0.43828$ | $d_2=0.06395$ | $n_2=1.65953$ | $\nu_2=57.0$ |
| $R_4 =+1.08680$ | $a_2=0.07195$ | air | |
| $R_5 =+0.97029$ | $d_3=0.04896$ | $n_3=1.64691$ | $\nu_3=33.9$ |
| $R_6 =+0.27096$ | $a_3=0.18886$ $\quad b_1=0.09393$ $\quad b_2=0.09493$ | diaphragm space | |
| $R_7 =-0.26444$ | $d_4=0.02198$ | $n_4=1.63652$ | $\nu_4=35.5$ |
| $R_8 =R_9 =+0.77003$ | $d_5=0.09693$ | $n_5=1.69347$ | $\nu_5=53.5$ |
| $R_{10}=-0.37233$ | $a_4=0.00300$ | air | |
| $R_{11}=+3.76623$ | $d_6=0.07794$ | $n_6=1.72381$ | $\nu_6=38.0$ |
| $R_{12}=-0.79382$ | | | |

According to the above table $$R_3 =+0.43828$$
$$R_{10}=-0.37233$$
$$R_3+R_{10}=+0.06595$$

The value of $+0.06595$ is clearly greater than zero and is definitely positive.

$n_3$ is 1.64691 and $n_5$ is 1.69347; thus, both values are greater than $n_4=1.63652$.

Furthermore, $n_6-n_4=1.72381-1.63652=0.08729$, i. e. clearly greater than 0.0370 and the individual steps of tural lens units (I, II, III, IV) are in the following ranges:

$1.0\,F<f_1<2.0\,F$
$1.5\,F<-f_2<3.5\,F$
$3.0\,F<-f_5<9.0\,F$
$0.5\,F<f_6<1.5\,F$

An important improvement attained by the objective of the present invention is demonstrated by the curves shown in Figures 4, 5 and 6. In each of these figures the axis of abscissas is denoted AA' and the axis of ordinates BB'. The curve of meridional coma in Figure 4 is denoted $C_1$, and the corresponding aberration curves in Figures 5 and 6 are denoted $C_2$ and $C_3$, respectively.

The curve in Figure 4 shows the meridional coma in the form of zonal image height aberrations in an objective of a relative aperture of 1:2 and focal length of 100 mm., which belongs to the class of modified Gauss-type objectives here in question, consists of four lens units comprising altogether six lenses and represents the latest state of the art prior to the present invention. (See H. Zollner, Foto-Kino-Technik, No. 3/1949, Figure 2(c).) In this curve, tangential coma is shown for an angle of inclination of 19°, the abscissas corresponding to the height of the rays in a plane passing through the vertex of the front surface of the objective, perpendicularly to the optical axis. The axis of coordinates corresponds to the highest incident ray, in Figure 4.

As a comparison, Figures 5 and 6 show the corresponding aberration curves in the case of objectives embodying the structures of Examples I and II, respectively, of the present invention, for an angle of inclination of 16° 50′ 56″ in the case of Example I and 17° 1′ 30″ in the case of Example II.

Calculation of the aberration curves of Figures 4, 5 and 6 shows that the pear-shaped disc or image produced under the conditions stated as a result of coma in the above mentioned objective of the prior art, has a height of 0.295 mm. while the pear-shaped disc produced in the objective embodying the present Example I under the stated equal conditions has a height of 0.057 mm. and the pear-shaped disc produced in the objective embodying the present Example II under the stated equal conditions has a height of 0.124 mm.

In the objectives compared, the aberration curves show a similar course, and, therefore, the form of their pear-shaped discs is likewise similar, and, in view of the equal section of rays, the intensity of light is proportional to the surface area. Therefore, the comparable ratio of intensities is, with very close approximation, proportional to the ratio of squares of the heights of the pear-shaped discs of zonal aberration.

In the above comparison, the ratios of said heights are:

$$\frac{0.295}{0.057} = 5.17$$

in the comparison with Example I, and $$\frac{0.295}{0.124} = 2.38$$

in the comparison with Example II.

The ratios of intensities are:

$$5.17^2 = 26.8$$

and $$2.38^2 = 5.66$$

This means that, under equal conditions, the effective cross-sections of the pear-shaped discs in the case of the two examples of the present invention amount to 3.7% and 17.7%, respectively, in comparison with a similar objective representing the latest state of the art prior to the present invention, or, in other words, the objective of the present invention is capable of showing correspondingly smaller details than said objective of the prior art.

In the appended drawings, $b_1$ denotes the distance between the diaphragm and the adjacent front member (I and II) on the side of the major conjugate and $b_2$ denotes the distance between the diaphragm and the rear member (III and IV) on the side of the major conjugate.

It will be understood that the present invention is not limited to the specific materials, structures, values and other specific details described above and illustrated in the drawings and may be carried out with various modifications without departing from the scope of the invention as defined in the appended claims.

What is claimed is:

1. A photographic objective of high light-transmitting capacity formed by two halves of the Gauss-type, which enclose the diaphragm: each of said halves being formed by (a) a diverging unit arranged near the diaphragm and composed of two lens elements of opposite power and (b) a further lens member having a converging effect and being turned away from the diaphragm; wherein on the one hand, the dioptrically most effective diverging surfaces, i. e. the inner surfaces of the diverging unit in both halves of the objective, are turned toward the diaphragm, and, on the other hand, the dioptrically most effective converging surfaces of the positive elements of the two halves of the objective, i. e. the outer surface of each of said further lens members having a converging effect and the outer surface of each of the two units enclosing the diaphragm, are turned away from the diaphragm, said outer converging surfaces having the strongest converging effect and having the radii of curvature on these two lens surfaces selected in such a manner that the sum of the two radii is clearly greater than zero and thus has a plainly positive value; moreover, and simultaneously, the refractive indices of the glasses in the half system arranged on the side of the shorter conjugate, i. e. on the image side in the meaning of the photographic picture, are increasing in the elements limited by said dioptrically most effective surfaces starting at the diaphragm and in the meaning of the photographic picture from the object side toward the image side, in such a manner that each difference of refractive indices for yellow light, starting from the diaphragm—i. e. from the center toward outside within the system— is clearly greater than 0.0185; the refractive indices of the glasses of lenses which enclose the diverging lens following the diaphragm in the meaning of the photographic picture, being distinctly greater for the yellow light of the spectrum, then the refractive index of said diverging lens following the diaphragm and, moreover and simultaneously, the difference of refractive indices for the same spectral color, of the glasses on the dioptrically most effective diverging surface adjacent the diaphragm on the side of the shorter conjugate, and in the positive converging surface which is most remote and turned away from the diaphragm on the side of the shorter conjugate, is distinctly greater than 0.0370; the radii of curvature of the individual refractive surfaces being in the following ranges:

$$0.4\,F < R_1 < 0.8\,F$$
$$1.0\,F < R_2 < 3.0\,F$$
$$0.3\,F < R_3 = R_{fII_a} < 0.6\,F$$
$$0.4\,F < R_4 < 4.0\,F$$
$$0.4\,F < R_5 < 4.0\,F$$
$$0.18\,F < R_6 = R_{rII_b} < 0.36\,F$$
$$0.18\,F < R_7 = R_{fIII_a} < 0.36\,F$$
$$0.5\,F < R_8 < 2.0\,F$$
$$0.5\,F < R_9 < 2.0\,F$$
$$0.3\,F < R_{10} < 0.6\,F$$
$$1.0\,F < R_{11} < \infty$$
$$0.6\,F < R_{12} < 1.0\,F$$

wherein $R_1, R_2 \ldots$ denote the radii of curvature of the successive lens surfaces counting from the front and F is the equivalent focal length of the total objective.

2. A photographic objective of high light-transmitting capacity formed by two halves of the Gauss-type, which enclose the diaphragm; each of said halves being formed by (a) a diverging unit arranged near the diaphragm and composed of two lens elements of opposite power and (b) a further lens member having a converging effect and being turned away from the diaphragm; wherein on the one hand, the dioptrically most effective diverging surfaces, i. e. the inner surfaces of the diverging unit in both halves of the objective, are turned toward the diaphragm, and, on the other hand, the dioptrically most effective converging surfaces of the positive elements of the two halves of the objective, i. e. the outer surface of each of said further lens members having a converging effect and the outer surface of each of the two units enclosing the diaphragm, are turned away from the diaphragm, said outer converging surfaces having the strongest converging effect and having the radii of curvature on these two lens surfaces selected in such a manner that the sum of the two radii is clearly greater than zero and thus has a plainly positive value; moreover, and simultaneously, the refractive indices of the glasses in the half system arranged on the side of the shorter conjugate, i. e. on the image side in the meaning of the photographic picture, are increasing in the elements limited by said dioptrically most effective surfaces starting at the diaphragm and in the meaning of the photographic picture from the object side toward the image side, in such a manner that each difference of refractive indices for yellow light, starting from the diaphragm—i. e. from the center toward outside within the system—is clearly greater than 0.0185; the refractive indices of the glasses of lenses which enclose the diverging lens following the diaphragm in the meaning of the photographic picture, being distinctly greater for the yellow light of the spectrum, then the refractive index of said diverging lens following the diaphragm and, moreover and simultaneously, the difference of refractive indices for the same spectral color, of the glasses on the dioptrically most effective diverging surface adjacent the diaphragm on the side of the shorter conjugate, and in the positive converging surface which is most remote and turned away from the diaphragm on the side of the shorter conjugate, is distinctly greater than 0.0370; the radii of curvature of the individual refractive surfaces being in the following ranges:

$$0.4 F < R_1 < 0.8 F$$
$$1.0 F < R_2 < 3.0 F$$
$$0.3 F < R_3 = R_{fII_a} < 0.6 F$$
$$0.4 F < R_4 < 4.0 F$$
$$0.4 F < R_5 < 4.0 F$$
$$0.18 F < R_6 = R_{fII_b} < 0.36 F$$
$$0.18 F < R_7 = R_{fIII_a} < 0.36 F$$
$$0.5 F < R_8 < 2.0 F$$
$$0.5 F < R_9 < 2.0 F$$
$$0.3 F < R_{10} < 0.6 F$$
$$1.0 F < R_{11} < \infty$$
$$0.6 F < R_{12} < 1.0 F$$

the focal lengths of the four individual structural lens units forming the objective being in the following ranges:

$$1.0 F < f_1 < 2.0 F$$
$$1.5 F < -f_{2_3} < 3.5 F$$
$$3.0 F < -f_{4_5} < 9.0 F$$
$$0.5 F < f_6 < 1.5 F$$

wherein F is equivalent focal length of the total objective, $R_1, R_2 \ldots$ denote the radii of curvature of the successive lens surfaces counting from the front and $f_1, f_{2_3}, f_{4_5}$ and $f_6$ denote the focal lengths of the four individual structural lens units forming the objective, counting from the front.

3. A photographic objective, having the numerical data set forth in the following table, wherein $R_1, R_2 \ldots$ denote the radii of curvature of the successive lens surfaces counting from the front; $d_1, d_2 \ldots$ the axial thicknesses of the individual lens elements; $a_1, a_2 \ldots$ the distances in air; $n_1, n_2 \ldots$ the refractive indices for the yellow light of the Fraunhofer line $d$ with a wave length of 5876 AE; $\nu_1, \nu_2 \ldots$ the Abbé numbers of the individual elements and the objective has a focal length of 1.0, a relative aperture of 1:2.3 and a paraxial intersectional width of 0.7177:

| | | | | |
|---|---|---|---|---|
| $R_1 = +0.60708$ | $d_1 = 0.05695$ | | $n_1 = 1.63909$ | $\nu_1 = 55.7$ |
| $R_2 = +1.64332$ | $a_1 = 0.00205$ | | | |
| $R_3 = +0.40395$ | $d_2 = 0.13076$ | | $n_2 = 1.61136$ | $\nu_2 = 59.0$ |
| $R_4 = +0.66243$ | $a_2 = 0$ | | | |
| $R_5 = R_4$ | $d_3 = 0.04009$ | $b_1 = 0.12480$ | $n_3 = 1.64819$ | $\nu_3 = 33.7$ |
| $R_6 = +0.26875$ | $a_3 = 0.19881$ | $b_2 = 0.07401$ | | |
| $R_7 = -0.28160$ | $d_4 = 0.02508$ | | $n_4 = 1.58241$ | $\nu_4 = 40.6$ |
| $R_8 = R_9 = 0.60708$ | $d_5 = 0.10485$ | | $n_5 = 1.61136$ | $\nu_5 = 59.0$ |
| $R_{10} = -0.38692$ | $a_4 = 0.00308$ | | | |
| $R_{11} = +2.68465$ | $d_6 = 0.04996$ | | $n_6 = 1.63909$ | $\nu_6 = 55.7$ |
| $R_{12} = -0.77385$ | | | | |

4. A photographic objective, having the numerical data set forth in the following table, wherein $R_1, R_2 \ldots$ denote the radii of curvature of the successive lens surfaces counting from the front; $d_1, d_2 \ldots$ the axial thicknesses of the individual lens elements; $a_1, a_2 \ldots$ the distances in air; $n_1, n_2 \ldots$ the refractive indices for the yellow light of the Fraunhofer line $d$ with a wave length of 5876 AE; $\nu_1, \nu_2 \ldots$ the Abbé numbers of the individual elements and the objective has a focal length of 1.0, a relative aperture of 1:2.0 and a paraxial intersectional width of 0.6972:

| | | | | |
|---|---|---|---|---|
| $R_1 = +0.63214$ | $d_1 = 0.05996$ | | $n_1 = 1.62139$ | $\nu_1 = 60.3$ |
| $R_2 = +1.76011$ | $a_1 = 0.00400$ | | | |
| $R_3 = +0.43828$ | $d_2 = 0.06395$ | | $n_2 = 1.65953$ | $\nu_2 = 57.0$ |
| $R_4 = +1.08680$ | $a_2 = 0.07195$ | | | |
| $R_5 = +0.97029$ | $d_3 = 0.04896$ | | $n_3 = 1.64691$ | $\nu_3 = 33.9$ |
| $R_6 = +0.27096$ | | $b_1 = 0.09393$ | | |
| | $a_3 = 0.18886$ | $b_2 = 0.09493$ | | |
| $R_7 = -0.26444$ | $d_4 = 0.02198$ | | $n_4 = 1.63652$ | $\nu_4 = 35.5$ |
| $R_8 = R_9 = +0.77003$ | $d_5 = 0.09693$ | | $n_5 = 1.69347$ | $\nu_5 = 53.5$ |
| $R_{10} = -0.37233$ | $a_4 = 0.00300$ | | | |
| $R_{11} = +3.76623$ | $d_6 = 0.07794$ | | $n_6 = 1.72381$ | $\nu_6 = 38.0$ |
| $R_{12} = -0.79382$ | | | | |

ALBRECHT WILHELM TRONNIER.

REFERENCES CITED

The following references are of record in the file of this patent:

UNITED STATES PATENTS

| Number | Name | Date |
|---|---|---|
| 1,786,916 | Merte | Dec. 30, 1930 |
| 1,955,591 | Lee | Apr. 17, 1934 |
| 2,117,252 | Lee | May 10, 1938 |
| 2,194,413 | Warmisham et al. | Mar. 19, 1940 |
| 2,416,969 | Warmisham et al. | Mar. 4, 1947 |

FOREIGN PATENTS

| Number | Country | Date |
|---|---|---|
| 439,556 | Germany | Jan. 13, 1927 |
| 423,468 | Great Britain | Feb. 1, 1935 |
| 427,008 | Great Britain | Apr. 12, 1935 |
| 665,520 | Germany | Sept. 27, 1938 |